(12) United States Patent
Pennings et al.

(10) Patent No.: US 12,309,509 B2
(45) Date of Patent: May 20, 2025

(54) SENSOR ARRANGEMENT AND METHOD OF PRODUCING A SENSOR ARRANGEMENT

(71) Applicant: ams Sensors Belgium BVBA, Berchem (BE)

(72) Inventors: Maarten Pennings, Waalre (NL); Johan De Meulder, Kessel (BE)

(73) Assignee: AMS SENSORS BELGIUM BVBA, Berchem (BE)

( * ) Notice: Subject to any disclaimer, the term of this patent is extended or adjusted under 35 U.S.C. 154(b) by 7 days.

(21) Appl. No.: 18/245,371

(22) PCT Filed: Sep. 14, 2021

(86) PCT No.: PCT/EP2021/075207
§ 371 (c)(1),
(2) Date: Mar. 15, 2023

(87) PCT Pub. No.: WO2022/058301
PCT Pub. Date: Mar. 24, 2022

(65) Prior Publication Data
US 2023/0370733 A1     Nov. 16, 2023

(30) Foreign Application Priority Data

Sep. 17, 2020     (EP) .................................. 20196692

(51) Int. Cl.
*H04N 25/131*     (2023.01)
*H04N 23/11*      (2023.01)
*H04N 25/13*      (2023.01)

(52) U.S. Cl.
CPC ........... *H04N 25/131* (2023.01); *H04N 23/11* (2023.01); *H04N 25/135* (2023.01)

(58) Field of Classification Search
CPC ..... H04N 23/11; H04N 25/135; H04N 25/131
See application file for complete search history.

(56) References Cited

U.S. PATENT DOCUMENTS

| 3,971,065 A | 7/1976 | Bayer |
| 2006/0186322 A1 | 8/2006 | Matsuyama |

(Continued)

FOREIGN PATENT DOCUMENTS

| CN | 208158780 U | 11/2018 |
| EP | 3848966 A1 | 7/2021 |
| EP | 3849173 A1 | 7/2021 |

OTHER PUBLICATIONS

Author Unknown, RGB-Ir Technology, https://www.ovt.com/purecel-pixel-tech/rgb-ir-technology/faqs, 1 page.

(Continued)

*Primary Examiner* — On S Mung
(74) *Attorney, Agent, or Firm* — MH2 Technology Law Group LLP (57) ABSTRACT

A sensor arrangement includes a first, second, third and fourth group of receiving elements for detecting light in the red, green, blue and infrared wavelength range. At least one first sub-arrangement is formed by arranging one receiving element of the first group, two receiving elements of the second group and one receiving element of the third group in a first Bayer-like pattern. At least one second sub-arrangement is formed by arranging two receiving elements of the second group, one receiving element of the fourth group and one receiving element of the first or the third group in a second Bayer-like pattern. The at least one first sub-arrangement and the at least one second sub-arrangement are arranged adjacent to each other in a main plane of extension of the sensor arrangement.

7 Claims, 5 Drawing Sheets

(56) References Cited

U.S. PATENT DOCUMENTS

| | | |
|---|---|---|
| 2015/0002707 A1 | 1/2015 | Wu |
| 2016/0255286 A1 | 9/2016 | Tsukada |
| 2016/0373664 A1 | 12/2016 | Wei |
| 2017/0134704 A1 | 5/2017 | Otsubo et al. |
| 2018/0366507 A1 | 12/2018 | Mlinar et al. |

OTHER PUBLICATIONS

European Search Report, EP Application No. 20196692.6, 9 pages.
International Search Report and Written Opinion dated Jan. 4, 2022, PCT Application No. PCT/EP2021/075207, 9 pages.
Chinese Office Action issued in corresponding Chinese Patent Application No. 202180063005.7 dated Sep. 4, 2024, with English language translation, 13 pages.

SENSOR ARRANGEMENT AND METHOD OF PRODUCING A SENSOR ARRANGEMENT

CROSS-REFERENCE TO RELATED APPLICATIONS

The present application is the national stage entry of International Patent Application No. PCT/EP2021/075207, filed on Sep. 14, 2021, and published as WO 2022/058301 A1 on Mar. 24, 2022, which claims priority to EP Application No. 20196692.6, filed on Sep. 17, 2020, all of which are incorporated by reference herein in their entireties.

FIELD OF THE INVENTION

The present disclosure relates to a sensor arrangement, an image sensor and a method for producing a sensor arrangement.

BACKGROUND OF THE INVENTION

CMOS image sensors are used in a wide range of applications, such as for camera modules and smartphones, tablet computers, laptops etc. Some of these applications, such as photography, rely on sensitivities in the visible optical domain while other applications, such as 3D imaging and identification, require the image sensor to be sensitive in the infrared (IR) domain. For example, the infrared domain is used in dark environments or at least in situations with limited brightness. But the infrared domain can also be used to enhance normal RGB images: it brings "texture" because infrared radiation can "see through" certain conditions like haze that light in the visible wavelength domain cannot. Due to space constraints in state of the art devices, it is desirable to provide an image sensor that is sensitive in both the visible and in the infrared domain. To this end, each sensor arrangement of the image sensor comprises color receiving elements, each sensitive to a certain portion of the visible spectrum as well as an IR receiving element for the infrared spectrum.

Sensor arrangements that have only visible color receiving elements typically have these arranged in a specific pattern, the so-called Bayer pattern, wherein the sensor arrangement comprises four receiving elements that are arranged in a 2×2 array, of which two receiving elements are arranged opposite to each other and are sensitive to the green portion of the visible spectrum, while the other two receiving elements show sensitivities in the blue and red domain, respectively. The reason for having two receiving elements for the green domain is that the human eye is more sensitive to green than to red or blue. An image signal processor (ISP) maps mono-color picture elements (every element only contains information of the single color of its receiving elements) to an array of poly-color picture elements (every element stores all received colors), which is achieved by evaluating the color information from neighboring receiving elements. Moreover, the ISP could employ algorithms, e.g. for edge preservation of the image. The image transformation made by the ISP is sometimes referred to as debayering.

Implementing an additional IR receiving element in these image sensors is typically achieved by sacrificing one of the green receiving elements of a Bayer filter array pattern. However, this leads to the fact that standard demosaicing, or debayering, resulting in a deteriorated image quality and/or to complicated and/or dedicated computation-intensive algorithms. Besides, the loss of a green receiving element leads to a deterioration of the image perception, since the human eye is most sensitive to green.

Therefore, an object to be achieved is to provide an improved concept for a sensor arrangement, which is capable of sensing light in the visible and infrared wavelength ranges and which overcomes the above mentioned drawbacks of existing sensor arrangements.

This object is achieved with the subject-matter of the independent claims. Embodiments and developments of the improved concept are defined as the dependent claims.

SUMMARY

The improved concept is based on the idea of quadrupling the Bayer pattern so that a 4×4 array of receiving elements is formed with 8 green receiving elements, 4 red receiving elements and 4 blue receiving elements. However, some of the blue (or the red) receiving elements can be replaced by near-infrared (NIR) receiving elements. In such arrays it is relatively easy to fill-in NIR receiving elements with blue (or red) color information from neighboring receiving elements, resulting in a standard RGGB Bayer pattern, so that existing ISP chips can be used for debayering.

Here and in the following, green receiving elements refer to receiving elements, which are capable to sense light in the green wavelength range. Accordingly, blue receiving elements and red receiving elements refer to receiving elements, which are capable to sense light in the blue or red wavelength range, respectively. IR receiving elements refer to receiving elements which are capable to sense light in the infrared domain, especially in the NIR domain. The term light may refer to electromagnetic radiation in general including infrared radiation, near-infrared radiation and visible light. Accordingly, green, blue, red and NIR light will refer to light in the respective wavelength range. Moreover, in the following the term "color information" refers to an intensity value of light in a specific wavelength range. For example, the wavelength range can correspond to blue, green or red light. However, it can also correspond to IR or NIR light. Accordingly, the term "color" refers to the respective wavelength domain of light, including the IR wavelength domain.

The sensor arrangement according to the improved concept comprises a first group of receiving elements being configured to detect light in the red wavelength range. Further it comprises a second group of receiving elements being configured to detect light in the green wavelength range, a third group of receiving elements being configured to detect light in the blue wavelength range and a fourth group of receiving elements being configured to detect light in the infrared wavelength range.

In the sensor arrangement according to the improved concept at least one first sub-arrangement is formed by arranging one receiving element of the first group, two receiving elements of the second group and one receiving element of the third group in a first Bayer-like pattern.

At least one second sub-arrangement is formed by arranging two receiving elements of the second group, one receiving element of the fourth group and one receiving element of the first or the third group in a second Bayer-like pattern.

Herein and in the following, the term "Bayer-like pattern" refers to a pattern, where four receiving elements are arranged in a 2×2 array, of which one receiving element is sensitive to a first wavelength range, two receiving elements are arranged opposite to each other and are sensitive to a second wavelength range, while the remaining receiving element shows sensitivity in a third or fourth wavelength range, respectively. This means that the Bayer-like pattern may be the original Bayer pattern, if two receiving elements are sensitive to green light, and the other two receiving elements are sensitive to red and blue light, respectively. However, the Bayer-like pattern can also comprise receiving elements which are sensitive to differently colored light. For example, one receiving element of the Bayer-like pattern could be sensitive to IR light, such that one receiving element of the original Bayer pattern is replaced by that IR receiving element.

In the first and the second Bayer-like pattern, receiving elements of same groups may be arranged on same places. For example, if the receiving elements of the second group are placed in the lower left and the upper right corner of the first Bayer-like pattern, the second Bayer-like pattern may have those receiving elements also in these corners. The same applies for receiving elements of other groups.

In a preferred embodiment, the first Bayer-like pattern refers to the original Bayer pattern formed by one red receiving element, two green receiving elements and one blue receiving element. In this preferred embodiment, the second Bayer-like pattern refers to a pattern, where the blue or the red receiving element of the original Bayer pattern is replaced by an IR receiving element.

In the sensor arrangement according to the improved concept the at least one first sub-arrangement and the at least one second sub-arrangement are arranged adjacent to each other in a main plane of extension of the sensor arrangement.

This means that the first sub-arrangement and the second sub-arrangement are arranged next to each other in lateral directions that are parallel to the main plane of extension of the sensor arrangement. This can further mean that the first sub-arrangement has a common border with the second sub-arrangement. However, in case that further first sub-arrangements are formed they also may have a common border with each other. The same applies for further second sub-arrangements.

Image sensors with sensitivities in both the visible and the infrared wavelength range can conveniently be employed for both imaging in the visible, such as photography, as well as imaging in the infrared for 3D imaging and/or identification applications that use active illumination with an infrared light source, for instance. The image quality can be enhanced by means of the infrared domain. Different wavelengths have different absorption characteristics in for example humid air like haze or fog. Infrared light has better absorption characteristics in those environments than visible light. Therefore, the addition of IR/NIR sensitivity in an image sensor allows for adding "texture" to images, which improves the image quality. Moreover, image sensors with sensitivity in IR/NIR domain allows usage in dark environments.

Each receiving element of the sensor arrangement according to the improved concept is configured to capture optical information that is incident upon the respective receiving element and to generate electrical information representative of the optical information. Especially for image sensors fabricated according to standard CMOS technologies, the working principle of the receiving elements is the conversion of optical intensity into a photocurrent using a photodiode. Silicon-based photodiodes are a common choice in this connection, as these diodes are sensitive over a broad wavelength range between 190 nm and 1100 nm and therefore cover the relevant part of the electromagnetic spectrum in both the visible and in the infrared domain. In addition, due to the large bandgap of silicon, silicon-based photodiodes show a superior noise performance compared to other photodiodes, such as germanium-based photodiodes.

For readout purposes, i.e. for the transfer of charges from the photodiodes to a storage capacitor, memory element, analog-to-digital converter or the like, the first, the second, the third and/or the fourth group of receiving elements can be connected to a shared floating diffusion. Alternatively, each group of receiving elements can be connected to a respective floating diffusion or all receiving elements are connected to an individual floating diffusion.

For adjusting the sensitivity to a certain portion of the spectrum of incident electromagnetic radiation, in addition to a photodiode, each receiving element can comprise an optical filter that is arranged between a top surface of the receiving element, i.e. of the photodiode, and a source of the incident electromagnetic radiation. For example, each receiving element comprises a wavelength filter.

The wavelength filter for each receiving element of the first, the second and the third group of receiving elements can be one of complementary color filters, for example according to the RGB additive color model. For instance, a red color filter is transmissive or translucent for red light but opaque for other light, particularly for green, blue and/or IR light. Hence, for each of the complementary colors red, green and blue, there is at least one receiving element of the first, the second or the third group of receiving elements that is sensitive for the respective complementary color. Here and in the following "transmissive" or "translucent" refers to a transparency of at least 60% or at least 80%.

Analogously, each receiving element of the fourth group of receiving elements can comprise an infrared filter, for example a near-infrared filter. In order to provide a receiving element that is predominantly or exclusively sensitive to infrared light of a certain wavelength range, the receiving elements of the fourth group of receiving elements can comprise an infrared filter. The wavelength range at which said infrared filter is transmissive can be dependent on the spectrum of an illuminating light source such as an infrared LED, for instance. For example, the wavelength range of transmission of the infrared filter includes light at 940 nm or at 850 nm.

By arranging the receiving elements of the sensor arrangement in Bayer-like patterns existing ISP chips can be used for debayering. This reduces the cost of an image sensor using said sensor arrangement, since no individual ISP chip has to be developed. By debayering, a digital image can be generated, which contains image information in the visible wavelength domain. A further image processing path may be present which outputs image information in the IR wavelength domain.

According to the improved concept, the second sub-arrangement differs from the first sub-arrangement in that a receiving element of the first or the third group is replaced by a receiving element of the fourth group. The loss in image quality, which can be expressed in peak signal-to-noise ratio (PSNR), is relatively low. This is because in the second sub-arrangement the missing color information from receiving elements of the first or the third group, respectively, can be extrapolated from the neighboring first sub-arrangement. Correspondingly, in the first sub-arrangement the missing IR color information can be extrapolated from the neighboring second sub-arrangement.

In embodiments, where the second sub-arrangement is formed by one red receiving element, two green receiving elements and one IR receiving element, the resulting sensor arrangement comprises more red receiving elements than blue receiving elements. This is advantageous, since the human eye is least sensitive to blue, but has a higher sensitivity for the red domain.

In some embodiments, the sensor arrangement comprises a plurality of first sub-arrangements and a plurality of second sub-arrangements. The plurality of first and second sub-arrangements are arranged in a matrix.

This means that the sensor arrangement may comprise at least two first sub-arrangements and at least two second sub-arrangements. In a preferred embodiment the first sub-arrangements and the second sub-arrangements may be arranged in a checkerboard manner.

The sensor arrangement can be formed as large as required in order to achieve a sufficient image resolution. Moreover, the receiving elements are arranged such that receiving elements of each group are effectively distributed over the matrix.

In some embodiments of the sensor arrangement, two of the first sub-arrangements and two of the second sub-arrangements are arranged in a 2×2 matrix such that each of the first and the second sub-arrangements are arranged in opposite corners of the 2×2 matrix.

Since each sub-arrangement is formed by four receiving elements, the sensor arrangement comprises a 4×4 array of receiving elements. Such array comprises 8 (50%) receiving elements of the second group and 2 (12.5%) receiving elements of the fourth group. Moreover, it comprises 4 (25%) receiving elements of the first group and 2 (12.5%) receiving elements of the third group or vice versa. This means that there is a surplus of receiving elements of the second group.

It is noted that further sub-arrangements may expand the sensor arrangement in each lateral direction. Thus, the 2×2 matrix may be understood as unit cell of a larger sensor arrangement comprising a plurality of such 2×2 matrices that are arranged adjacent to each other.

Receiving elements of each group are distributed over the sensor arrangement in an effective way. Moreover, the sensor arrangement comprises a sufficiently large amount of receiving elements of each group per area. For example, there is a surplus of green receiving elements as the human eye is most sensitive for green. Each sub-arrangement is formed as a Bayer-like pattern, which allows the usage of conventional ISP chips.

In some embodiments the at least one second sub-arrangement is formed by arranging one receiving element of the first group, two receiving elements of the second group, and one receiving element of the fourth group in the second Bayer-like pattern. At least one third sub-arrangement is formed by arranging two receiving elements of the second group, one receiving element of the third group and one receiving element of the fourth group in a third Bayer-like pattern.

The first, the second and the third sub-arrangements are arranged adjacent to each other in the main plane of extension of the sensor arrangement.

As mentioned above, the first Bayer-like pattern refers to the original Bayer pattern formed by one red receiving element, two green receiving elements and one blue receiving element. In that embodiment the second Bayer-like pattern is defined as pattern, where the blue receiving element of the original Bayer pattern in replaced by an IR receiving element. The third Bayer-like pattern refers to a pattern, where the red receiving element is replaced by an IR receiving element.

In the first, the second and third Bayer-like pattern, receiving elements of the first, second and third group may be arranged on same places. For example, if the receiving elements of the second group are placed in the lower left and the upper right corner of the first Bayer-like pattern, the third Bayer-like pattern may have those receiving elements also in these corners. The same applies for receiving elements of the first and the third group.

The first, the second and the third sub-arrangement may be arranged such that one of the sub-arrangements has common borders with the respective other two sub-arrangements. However, in case that further first sub-arrangements are formed they also may have a common border with each other. The same applies for further second sub-arrangements and further third sub-arrangements.

The loss in image quality is low since missing color information of each sub-arrangement can be extrapolated from neighboring sub-arrangements which have receiving elements for detecting that missing color. For example, in the third sub-arrangements the missing color information for red can be extrapolated from neighboring first sub-arrangements or second sub-arrangements.

In some embodiments the sensor arrangement comprises a plurality of first sub-arrangements, a plurality of second sub-arrangements and/or a plurality of third sub-arrangements, the plurality of first, second and third sub-arrangements being arranged in a matrix.

The matrix can be such that different sub-arrangements are adjacent to each other and share a common border. However, sub-arrangements of the same kind can also be adjacent to each other, so that they share a common border.

The sensor arrangement can be formed as large as required in order to achieve a sufficient image resolution. Moreover, the receiving elements can be arranged such that receiving elements of each group are effectively distributed over the matrix.

In some embodiments of the sensor arrangement two of the first sub-arrangements, one of the second sub-arrangements and one of the third sub-arrangement are arranged in a 2×2 matrix such that the first sub-arrangements are arranged in opposite corners of the 2×2 matrix.

Since each sub-arrangement is formed by four receiving elements, the receiving element arrangement comprises a 4×4 array of receiving elements. Such array comprises 8 green receiving elements (50% of the total number of receiving elements), 3 red receiving elements (18.75%), 3 blue receiving elements (18.75%), and 2 IR receiving elements (12.5%).

It is noted that the sensor arrangement may comprise further first, second and third sub-arrangements, which may expand the sensor element arrangement in each lateral direction. In that sense, the 2×2 matrix may be understood as unit cell of the sensor arrangement comprising a plurality of such 2×2 matrices that are arranged adjacent to each other.

Receiving elements of each group are distributed over the sensor arrangement in an effective way. Moreover, the sensor arrangement comprises a sufficiently large amount of receiving elements of each group per area. For example, there is a surplus of green receiving elements as the human eye is most sensitive for green. Each sub-arrangement is formed as a Bayer-like pattern, which allows the usage of conventional ISP chips.

In some embodiments of the sensor arrangement three of the first sub-arrangements, three of the second sub-arrangements and three of the third sub-arrangements are arranged in a 3×3 matrix, such that different sub-arrangements are adjacent to each other in the main plane of extension of the sensor arrangement.

Different sub-arrangements are adjacent to each other in lateral directions. This means that the first, the second and the third sub-arrangements are arranged next to each other such that first sub-arrangement have common borders with second sub-arrangements and other common borders with third sub-arrangements. Additionally, second sub-arrangements have common borders with third sub-arrangements. Sub-arrangements of the same kind have no common borders with each other.

Since each sub-arrangement is formed by four receiving elements, the receiving element arrangement comprises a 6×6 array of receiving elements. Such array comprises 18 green receiving elements (50% of the total number of receiving elements), 6 red receiving elements (16.67%), 6 blue receiving elements (16.67%), and 6 IR receiving elements (16.7%).

It is noted that the receiving element arrangement may comprise further first, second and third sub-arrangements, which may expand the sensor arrangement in each lateral direction. In that sense, the 3×3 matrix may be understood as unit cell of a larger sensor arrangement comprising a plurality of such 3×3 matrices that are arranged adjacent to each other.

Receiving elements of each group are distributed over the sensor arrangement in an effective way. Moreover, the sensor arrangement comprises a sufficiently large amount of receiving elements of each group per area. For example, there is a surplus of green receiving elements. Each sub-arrangement is formed as a Bayer-like pattern, which allows the usage of conventional ISP chips. Moreover, the loss in image quality is low, because color information that is missing in one of the sub-arrangement can be extrapolated from neighboring sub-arrangements.

In some embodiments of the sensor arrangement receiving elements have a top surface of rectangular, in particular of square, shape. Receiving elements of rectangular or square shape can be combined to arrays. Four receiving elements can be arranged in a Bayer-like pattern.

In some embodiments of the sensor arrangement the receiving elements comprise a sensor element, for example a photodiode.

As mentioned above, the sensor elements are configured to capture optical information from electromagnetic radiation that is incident upon the respective sensor element. The sensor elements generate electrical signals representative of the optical information. Especially for image sensors fabricated according to standard CMOS technologies, the working principle of the sensor elements is the conversion of optical intensity into a photocurrent using a photodiode. In some embodiments, the sensor elements, for example the photodiodes, are adjusted to a portion of the wavelength spectrum. This means that the sensor elements can be implemented differently depending on the wavelength range to be detected by them. Thus, at least some of the sensor elements could have different characteristics such as being more sensitive to NIR light.

The sensor elements, for example photodiodes, convert optical information efficiently into electrical signals, which can be further evaluated by means of read-out circuits. In some embodiments of the sensor arrangement receiving elements further comprise a wavelength filter.

For example, the first, the second and the third group of receiving elements is sensitive to a certain portion of the visible domain such as the red, green or blue portion. For example, the sensitivity is achieved by employment of appropriate color filters as described above. This way, four receiving elements of those groups can be arranged in an array for realizing the aforementioned Bayer pattern or a Bayer-like pattern.

The receiving elements of the fourth group comprises an infrared filter. For example, the infrared filter can be a near-infrared filter. Receiving elements are provided that are predominantly or exclusively sensitive to infrared light of a certain wavelength range by means of an infrared filter as described above. The wavelength range at which said infrared filter is transmissive can be dependent on the spectrum of an illuminating light source such as an infrared LED, for instance. For example, the wavelength range of transmission of the infrared filter includes light at 940 nm or at 850 nm.

In some embodiments the sensitivity to specific wavelength domains is achieved by a combination of more than one filter. For example, a bandpass filter is combined with a cut-off filter. The bandpass filter may be transmissive for light of a specific color, while the cut-off filter may additionally block light in a different wavelength domain, e.g. ultra-violet (UV) light.

Furthermore, an image sensor is provided that comprises the sensor arrangement. This means that all features disclosed for the sensor arrangement are also disclosed for and applicable to the image sensor and vice-versa. The image sensor further comprises circuitry for reading out electrical signals from the receiving elements.

For example, for readout purposes, the image sensor comprises storage capacitors, memory elements, an analog-to-digital converter (ADC) or the like.

Such an image sensor can be conveniently employed in electronic devices, such as smart phones, tablet computers, laptops, or camera modules. For example, the camera module is configured to operate in the visible domain for photography and/or video capturing and in the infrared domain for 3-D imaging and/or identification purposes. Moreover, image sensors with infrared sensitivity can be used in dark environments where video feed is required. Such application reach from mobile phone face unlock to automotive driver monitoring systems. Both deploy illuminators that are in the NIR spectrum, so that the phone user/driver is not blinded by the light that is illuminating him/her. This means that the illuminator, which may use flash light, does not disturb the person being filmed as this flash is in the invisible wavelength range, e.g. NIR light.

In some embodiments the image sensor further comprises an image signal processor, which is configured to generate a digital image based on the electrical signals from the receiving elements.

The circuitry can be implemented such that the electrical signals coming from the receiving elements are pre-processed for the ISP. For example, pre-processing may comprise emulating missing color information. The circuitry may provide a further image processing path to the ISP for image information in the IR wavelength domain. As mentioned above, the ISP maps mono-color picture elements to an array of poly-color picture elements, which is achieved by evaluating the color information from neighboring receiving elements. Moreover, the ISP may also be responsible for edge preservation of the image, among other tasks. The image transformation made by the ISP is referred to as debayering. Conventional ISP chips can be used for the image sensor since the receiving elements are arranged according to Bayer-like patterns.

The object is further solved by a method for producing a sensor arrangement. All features disclosed for the sensor arrangement are also disclosed and applicable to method for producing a sensor arrangement and vice-versa.

The method comprises providing a first group of receiving elements which are configured to detect light in the red wavelength range, providing a second group of receiving elements which are configured to detect light in the green wavelength range, providing a third group of receiving elements which are configured to detect light in the blue wavelength range and providing a fourth group of receiving elements which are configured to detect light in the infrared wavelength range.

The method further comprises forming at least one first sub-arrangement by arranging one receiving element of the first group, two receiving elements of the second group and one receiving element of the third group in a first Bayer-like pattern.

The method further comprises forming at least one second sub-arrangement by arranging two receiving elements of the second group, one receiving element of the fourth group and one receiving element of the first or third group in a second Bayer-like pattern.

The method further comprises arranging the at least one first sub-arrangement and the at least one second sub-arrangement adjacent to each other in a main plane of extension of the sensor arrangement.

By arranging the receiving elements in Bayer-like patterns existing ISP chips can be used for debayering. This reduces the cost of an image sensor using said sensor arrangement, since no individual ISP chip has to be developed. The loss in image quality is low, since color information, which is missing in one respective sub-arrangement can be extrapolated from neighboring sub-arrangements.

In a variant of the method it further comprises forming a plurality of first sub-arrangements and a plurality of second sub-arrangements and arranging the plurality of first and second sub-arrangements in a matrix.

The sensor arrangement can be formed as large as required in order to achieve a sufficient image resolution. Moreover, the receiving elements can be arranged such that receiving elements of each group are effectively distributed over the matrix.

In a variant of the method two of the first sub-arrangements and two of the second sub-arrangements are arranged in a 2×2 matrix such that each of the first and the second sub-arrangements are arranged in opposite corners of the 2×2 matrix.

Receiving elements of each group are distributed over the receiving element arrangement in an effective way. Moreover, the sensor arrangement comprises a sufficiently large amount of receiving elements of each group per area.

Further embodiments of the method become apparent to the skilled reader from the embodiments of the receiving element arrangement described above.

BRIEF DESCRIPTION OF THE DRAWINGS

The following description of figures may further illustrate and explain aspects of the improved concept. Components and parts of the sensor arrangement that are functionally identical or have an identical effect are denoted by identical reference symbols. Identical or effectively identical components and parts might be described only with respect to the figures where they occur first. Their description is not necessarily repeated in successive figures.

DETAILED DESCRIPTION

Figure 1:
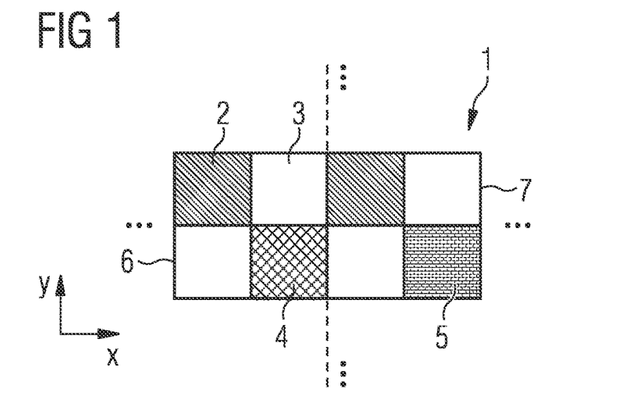
FIG. 1 shows an exemplary embodiment of a sensor arrangement according to the improved concept.

FIG. 1 shows a top view of an exemplary embodiment of a sensor arrangement 1. The sensor arrangement 1 according to FIG. 1 comprises eight receiving elements 2, 3, 4, 5 arranged in a 2×4 array. In particular, the sensor arrangement 1 comprises one receiving element 2 of a first group, four receiving elements 3 of a second group, one receiving element 4 of a third group and one receiving element 5 of a fourth group.

Receiving elements 2 of the first group are configured to detect light in the red wavelength range. In the following they will therefore be referred as to red receiving elements 2.

Receiving elements 3 of the second group are configured to detect light in the green wavelength range, so they will be referred as to green receiving elements 3.

Receiving elements 4 of the third group are configured to detect light in the blue wavelength range, so they will be referred as to blue receiving elements 4.

Receiving elements 5 of the fourth group are configured to detect light in the infrared (IR) or near-infrared (NIR) wavelength range, so they will be referred as to IR receiving elements 5.

The sensor arrangement 1 according to FIG. 1 can be seen as being formed by a first sub-arrangement 6 forming a first Bayer-like pattern and a second sub-arrangement 7 forming a second Bayer-like pattern. The respective Bayer-like pattern is formed by a 2×2 array of receiving elements of which two receiving elements are arranged opposite to each other and are sensitive to a first wavelength range, while the other two receiving elements show sensitives in a second and third wavelength range, respectively. Thus, the Bayer-like pattern comprises an upper right, an upper left, a lower right and a lower left corner of the pattern.

In the first sub-arrangement 6 of FIG. 1, the first Bayer-like pattern is formed by one red receiving element 2, two green receiving elements 3 and one blue receiving elements 4. The two green receiving elements 3 are arranged opposite to each other in the lower left and in the upper right corner of the first Bayer-like pattern. The red receiving element 2 is arranged in the upper left corner and the blue receiving elements 4 is arranged in the lower right corner of the first Bayer-like pattern. However, the positions of the respective receiving elements 2, 3, 4 within the first Bayer-like pattern can also be interchanged as long as the two green receiving elements 3 are arranged opposite to each other.

In the second sub-arrangement 7 of FIG. 1, the second Bayer-like pattern is formed by one red receiving element 2, two green receiving elements 3 and one IR receiving element 5. The two green receiving elements 3 are arranged opposite to each other in the lower left and in the upper right corner of the second Bayer-like pattern. The red receiving element 2 is arranged in the upper left corner and the IR receiving element 5 is arranged in the lower right corner of the second Bayer-like pattern. The positions of the respective receiving elements 2, 3, 5 within the second Bayer-like pattern can also be interchanged as long as the two green receiving elements 3 are arranged opposite to each other. However, the positions of receiving elements of the same group can be equal in the first Bayer-like pattern and in the second Bayer-like pattern. This means that receiving elements that are common to the first sub-arrangement 6 and the second sub-arrangement 7 can be in same positions.

The first sub-arrangement 6 and the second sub-arrangement 7 are adjacent to each other in a lateral direction x. Lateral directions x, y run parallel to a main plane of extension of the sensor arrangement 1. This means that the first subs-arrangement shares a common border with the second sub-arrangement 7. The common border is indicated by a dashed line.

It is noted that the sensor arrangement 1 may comprise further first and second sub-arrangements 6, 7, which are arranged in a similar manner next to the sub-arrangements shown in FIG. 1. This means that further sub-arrangements may expand the sensor arrangement 1 in each lateral direction x, y, as indicated by the ellipses. In that sense, FIG. 1 may show a unit cell of the sensor arrangement 1.

Figure 2:
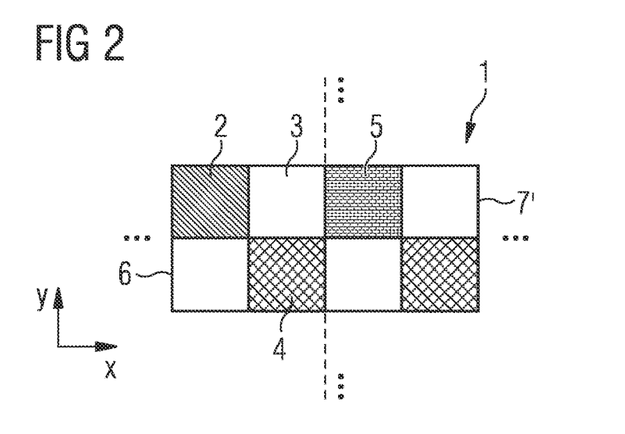
FIG. 2 shows another exemplary embodiment of a sensor arrangement according to the improved concept.

FIG. 2 shows a top view of another exemplary embodiment of the sensor arrangement 1. The sensor arrangement 1 according to FIG. 2 is similar to that of FIG. 1, however, it differs in that the second sub-arrangement 7' is formed by one IR receiving element 5, two green receiving elements 3 and one blue receiving elements 4 forming the second Bayer-like pattern. Again, the two green receiving elements 3 are arranged opposite to each other in the lower left and in the upper right corner of the first Bayer-like pattern. The IR receiving element 5 is arranged in the upper left corner and the blue receiving elements 4 is arranged in the lower right corner of the second Bayer-like pattern. Therefore, the positions of receiving elements of same groups are equal in the first Bayer-like pattern and in the second Bayer-like pattern.

All other features, which have been described in context of FIG. 1, apply to the embodiment shown in FIG. 2, too. It is noted that both embodiments can also be combined with each other such that an overall sensor arrangement 1 is formed by combining the sensor arrangements 1 according to FIGS. 1 and 2.

Figure 3:
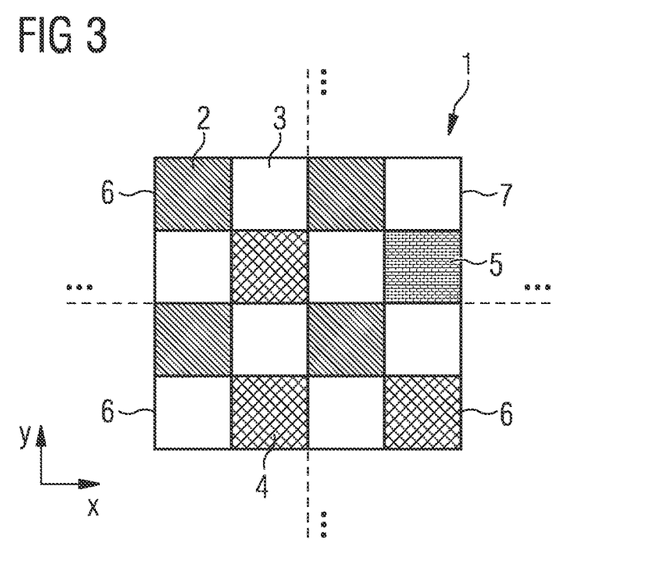
FIG. 3 shows another exemplary embodiment of a sensor arrangement according to the improved concept.

FIG. 3 shows a top view of another exemplary embodiment of the sensor arrangement 1. The sensor arrangement 1 of FIG. 3 comprises three first sub-arrangements 6 and one second sub-arrangement 7 as the one described in FIG. 1. The first and second sub-arrangements 6, 7 are arranged in a 2×2 matrix such that they are adjacent to each other in lateral directions x, y.

In that embodiment the three first sub-arrangements 6 are arranged in three quadrants of the sensor arrangement 1, while the second sub-arrangement 7 is arranged in the remaining quadrant. The quadrants of the sensor arrangement 1 are indicated in FIG. 3 by dashed lines. The assignment of sub-arrangements to specific quadrants of the sensor arrangement 1 is arbitrary.

It becomes apparent for the skilled reader that similar sensor arrays as that of FIG. 3 can be formed by interchanging the first and the second sub-arrangements 6, 7, so that three second sub-arrangements 7 and one first sub-arrangement 6 are combined. Moreover, the second sub-arrangement 7' can also be formed as that described in FIG. 2, i.e. by providing two green, one blue and one IR receiving elements 5.

All other features, which have been described in context of FIG. 1, apply to the embodiment shown in FIG. 3, too. It is noted that those embodiments can also be combined with each other such that an overall sensor arrangement 1 is formed by combining the sensor arrangement 1s according to FIGS. 1 to 3.

Figure 4:
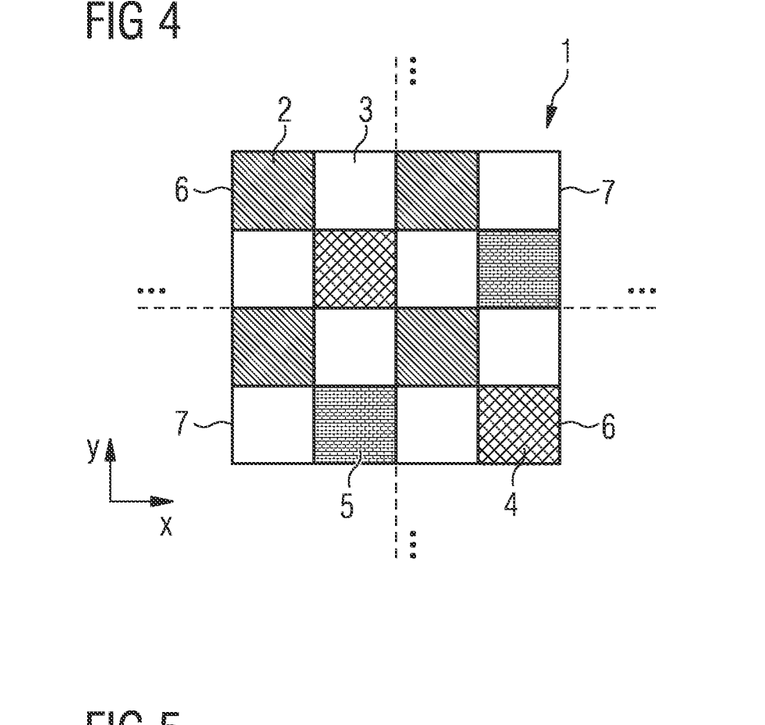
FIG. 4 shows another exemplary embodiment of a sensor arrangement according to the improved concept.

FIG. 4 shows a top view of a preferred embodiment of the sensor arrangement 1. The sensor arrangement 1 of FIG. 4 comprises two first sub-arrangements 6 and two second sub-arrangements 7 as the one described in FIG. 1. The first and second sub-arrangements 6, 7 are arranged in a 2×2 matrix such that they are adjacent to each other in lateral directions x, y.

In that embodiment the two first sub-arrangements 6 are arranged in opposite quadrants of the sensor arrangement 1, while the two second sub-arrangements 7 are arranged in the two remaining opposite quadrants. The quadrants of the sensor arrangement 1 are indicated in FIG. 4 by dashed lines. The assignment of sub-arrangements to specific quadrants of the sensor arrangement 1 is arbitrary, as long as equal sub-arrangements, i.e. sub-arrangements with equal Bayer-like patterns, are arranged in opposite quadrants. Therefore, the sub-arrangements are arranged in checkerboard pattern.

The sensor arrangement 1 according to that embodiment comprises sixteen receiving elements arranged in a 4×4 array. In particular, the sensor arrangement 1 comprises eight green receiving elements 3, four red receiving elements 2, two blue receiving elements 4 and two IR receiving elements 5. Compared to a conventional Bayer pattern array two, blue receiving elements 4 are replaced by IR receiving elements 5. An image sensor 14 comprising that sensor arrangement 1 is enabled to detect IR radiation. The loss in color information in the blue domain can be compensated by the efficient distribution of blue receiving elements 4. Besides, the human eye is least sensitive to blue, so that the missing color information is less significant.

It is noted that the sensor arrangement 1 may comprise further first and second sub-arrangements 6, 7, which are arranged in a similar manner next to the sub-arrangements shown in FIG. 4. This means that further sub-arrangements may expand the sensor arrangement 1 in each lateral direction x, y, as indicated by the ellipses. In that sense, FIG. 4 shows a unit cell of the sensor arrangement 1. Moreover, the embodiment according to FIG. 4 can be combined with the previously discussed embodiments according to FIGS. 1-3.

Figure 5:
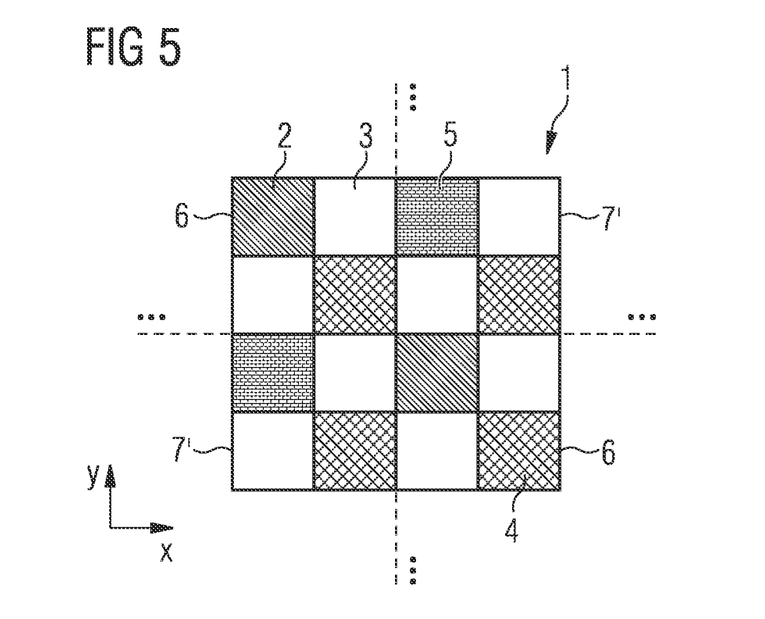
FIG. 5 shows another exemplary embodiment of a sensor arrangement according to the improved concept.

FIG. 5 shows a top view of another preferred embodiment of the sensor arrangement 1, which is similar to the embodiment of FIG. 4. The embodiment according to FIG. 5 differs in that the second sub-arrangement 7' is formed by one IR receiving element 5, two green receiving elements 3 and one blue receiving elements 4 forming the second Bayer-like pattern, as discussed in FIG. 2.

The sensor arrangement 1 therefore comprises eight green receiving elements 3, four blue receiving elements 4, two red receiving elements 2 and two IR receiving elements 5. Thus, compared to the embodiment of FIG. 4 that embodiment has less sensitivity to the red domain, however, it is more sensitive for blue.

All other features, which have been described in context of FIG. 4, apply to the embodiment shown in FIG. 5, too.

Figure 6:
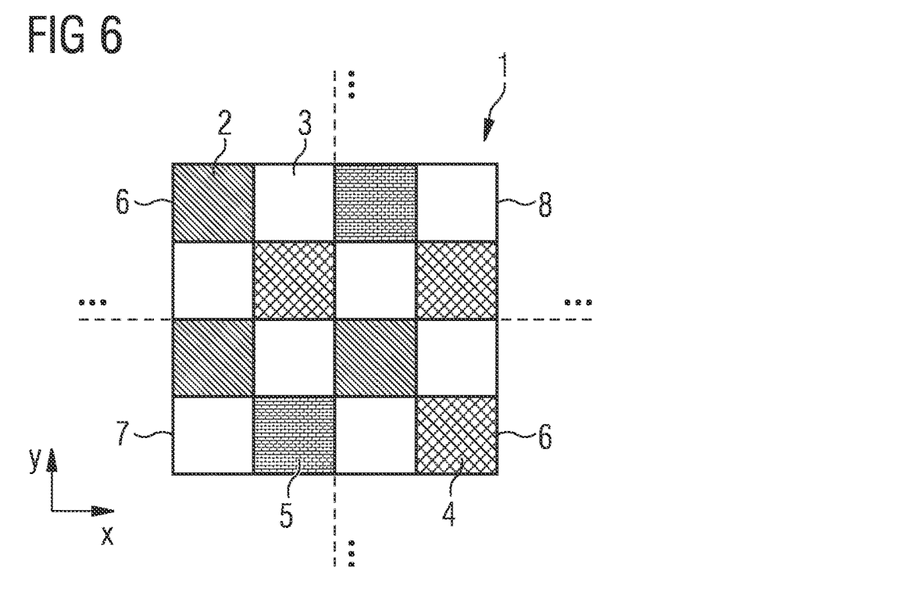
FIG. 6 shows another exemplary embodiment of a sensor arrangement according to the improved concept.

FIG. 6 shows a top view of another preferred embodiment of the sensor arrangement 1. In that embodiment the second sub-arrangement 7 is formed by one red receiving element 2, two green receiving elements 3 and one IR receiving element 5 forming the second Bayer-like pattern (see second Bayer-like pattern as shown in FIG. 1). A third sub-arrangement 8 is formed by one IR receiving element 5, two green receiving elements 3 and one blue receiving elements 4 forming a third Bayer-like pattern. The third Bayer-like pattern corresponds to the second Bayer-like pattern shown in FIG. 2. This means that in this embodiment both variations for the second Bayer-like pattern are combined.

The first, second and third sub-arrangements 6, 7, 8 are arranged in a 2×2 matrix such that they are adjacent to each other in lateral directions x, y. In that embodiment the two first sub-arrangements 6 are arranged in opposite quadrants of the sensor arrangement 1, while the second and third sub-arrangements 7, 8 are arranged in the two remaining opposite quadrants. The quadrants of the sensor arrangement 1 are indicated in FIG. 6 by dashed lines. The assignment of sub-arrangements to specific quadrants of the sensor arrangement 1 is arbitrary.

Again, the sensor arrangement 1 according to that embodiment comprises sixteen receiving elements arranged in a 4×4 array. In this case, however, the sensor arrangement 1 comprises eight green receiving elements 3, three red receiving elements 2, three blue receiving elements 4 and two IR receiving elements 5. Therefore, there is an equal number of red and blue receiving elements 4.

As before, the sensor arrangement 1 according to FIG. 6 can be expanded in each lateral direction x, y.

Figure 7:
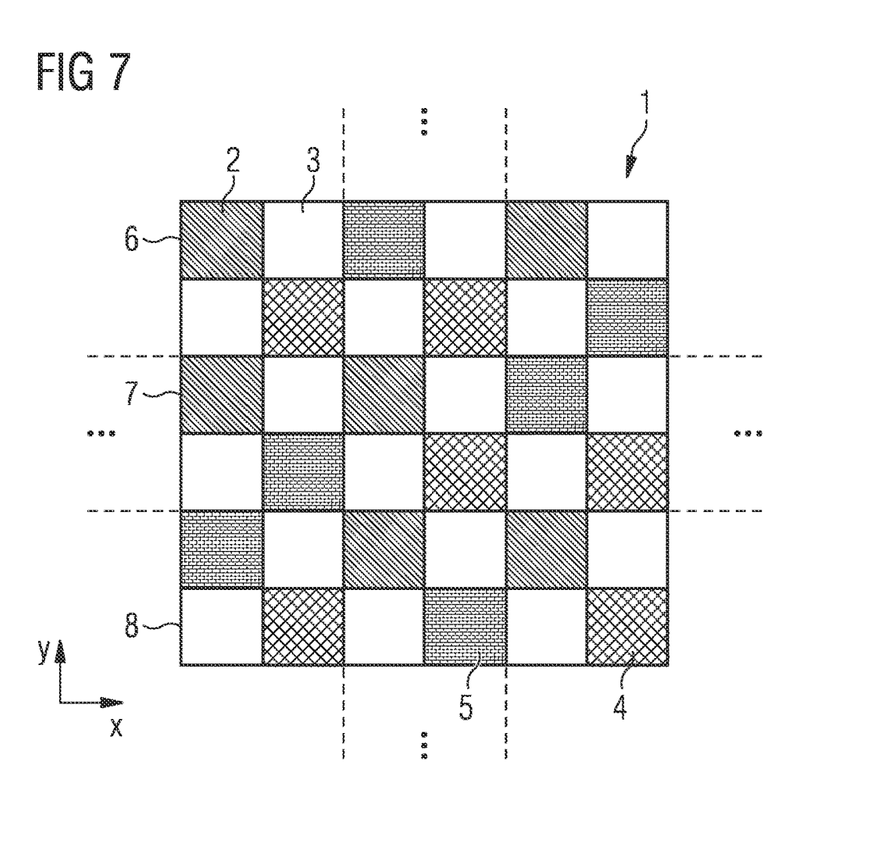
FIG. 7 shows another exemplary embodiment of a sensor arrangement according to the improved concept.

FIG. 7 shows a top view of another embodiment of the sensor arrangement 1. The sensor arrangement 1 according to that embodiment comprises three first sub-arrangements 6, three second sub-arrangements 7 and three third sub-arrangements 8, which are arranged in 3×3 matrix.

The sub-arrangements are arranged in the 3×3 matrix such that different sub-arrangements are adjacent to each other in lateral directions x, y. In other words, equal sub-arrangements do not share common borders with each other. This means that first sub-arrangements 6 share common borders with second sub-arrangements 7 and third sub-arrangements 8, but not with other first sub-arrangements 6. Accordingly, this applies also to second and third sub-arrangements 7, 8.

FIG. 7 shows one exemplary placement of the sub-arrangements within the 3×3 matrix. However, the exact position of each sub-arrangement within the sensor arrangement 1 is arbitrary. Other arrangements are also possible.

The embodiment according to FIG. 7 comprises receiving elements arranged in a 6×6 array. For example, the sensor arrangement 1 comprises eighteen green receiving elements 3 (50%), 6 red receiving elements 2 (16.67%), 6 blue receiving elements 4 (16.67%) and 6 IR receiving elements 5 (16.67%). Therefore, the numbers of red, blue and IR receiving elements 5 are equal and those receiving elements are evenly distributed over the sensor array. There is a surplus of green receiving elements 3, which is justified by the fact that the human eye is most sensitive for the green wavelength domain.

As before, the sensor arrangement 1 can be expanded by further sub-arrangement to form a sufficiently large array of receiving elements.

Figure 8:
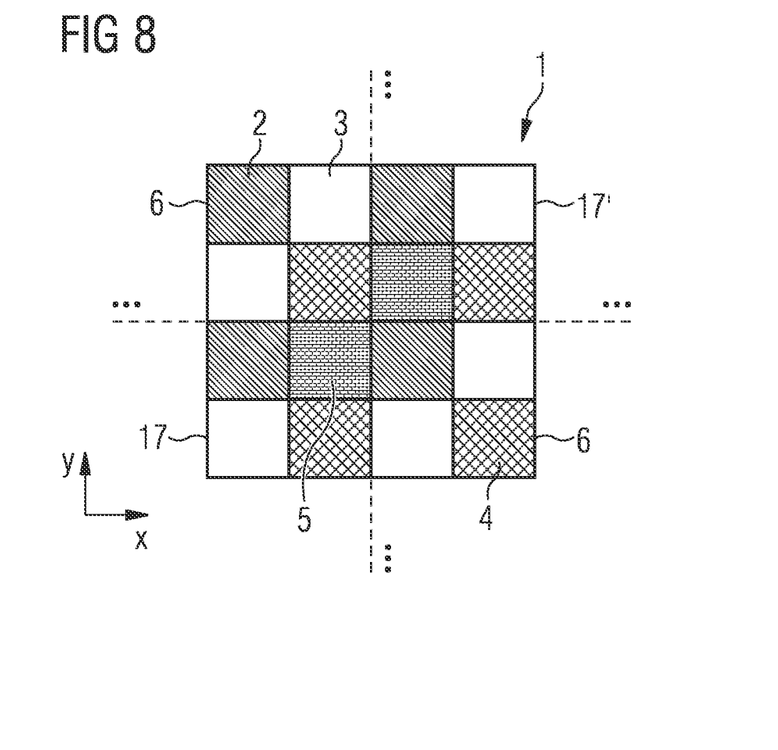
FIG. 8 shows example of a sensor arrangement.

FIG. 8 shows a top view of an exemplary sensor arrangement 1. That example comprises two first sub-arrangements 6 and two further sub-arrangements 17, 17', which are formed by one red receiving element 2, one green receiving element, one blue receiving elements 4 and one IR receiving element 5. This means that compared to a conventional Bayer pattern one of the green receiving elements 3 is replaced. In one of the two further sub-arrangements 17, 17' the green receiving element in the upper right corner of the 2×2 array is replaced by the IR receiving element 5, while in the other one of the two further sub-arrangements 17, 17' the green receiving element in the lower left corner of the 2×2 array is replaced by the IR receiving element 5.

The first and the further sub-arrangements 6, 17, 17' are arranged in a 2×2 matrix such that they are adjacent to each other in lateral directions x, y. In that embodiment the two first sub-arrangements 6 are arranged in opposite quadrants of the sensor arrangement 1, while the further sub-arrangements 17, 17' are arranged in the two remaining opposite quadrants. The quadrants of the sensor arrangement 1 are indicated in FIG. 8 by dashed lines. The assignment of sub-arrangements to specific quadrants of the sensor arrangement 1 is arbitrary.

Figure 9:
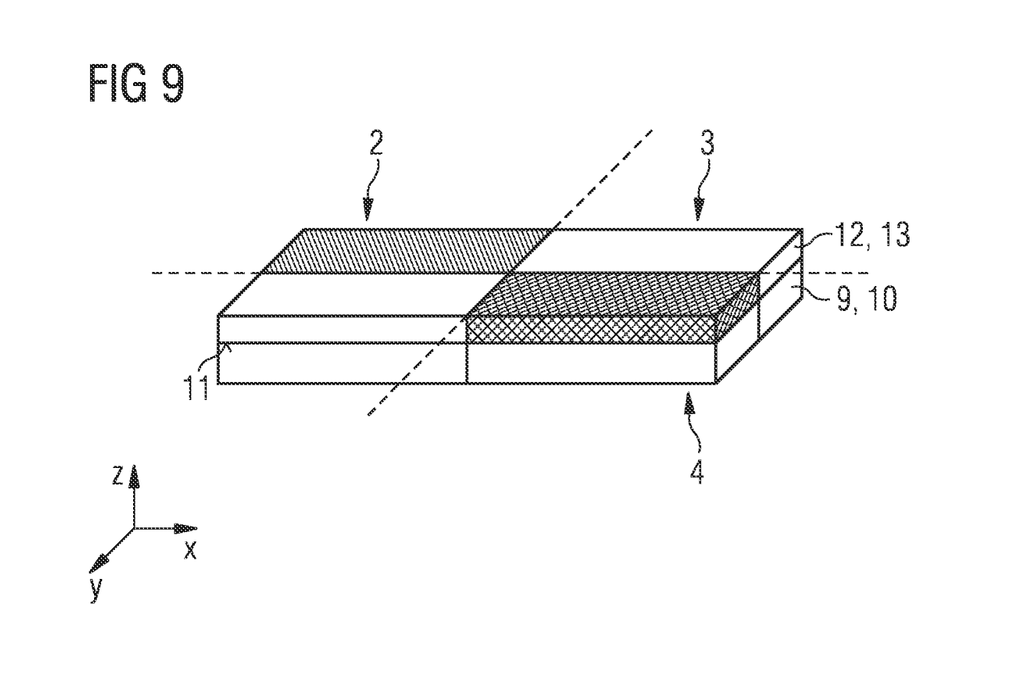
FIG. 9 shows a perspective view on a sub-arrangement.

FIG. 9 shows a perspective view of an exemplary first sub-arrangement 6 of the sensor arrangement 1. The dashed lines indicate that further sub-arrangements can be arranged next to it in the lateral directions x, y such that the complete sensor arrangement 1 is formed. The first sub-arrangement 6 comprises a substrate 9 in which sensor elements 10 are arranged. The sensor elements 10 each can be formed in the same substrate 9, for example a semiconductor substrate 9. Each sensor element 10 comprises a top surface 11.

In a vertical direction z, which is perpendicular to the main plane of extension of the sensor arrangement 1, a filter layer 12 is arranged on the top surfaces 11 of the sensor elements 10. The filter layer 12 comprises wavelength filters 13, such that they form the first Bayer-like pattern. This means that two opposing wavelength filters 13 are transparent for green light, while the remaining wavelength filters 13 are transparent for red and blue light, respectively. A wavelength filter 13 for IR light can be similarly arranged on top of a sensor element 10. The wavelength filters 13 are arranged between the top surfaces 11 of the sensor elements 10 and a source of the incident electromagnetic radiation (not shown). This way, the underlying sensor elements 10 detect light in that specific wavelength domain, for which the respective wavelength filter 13 is transparent.

Figure 10:
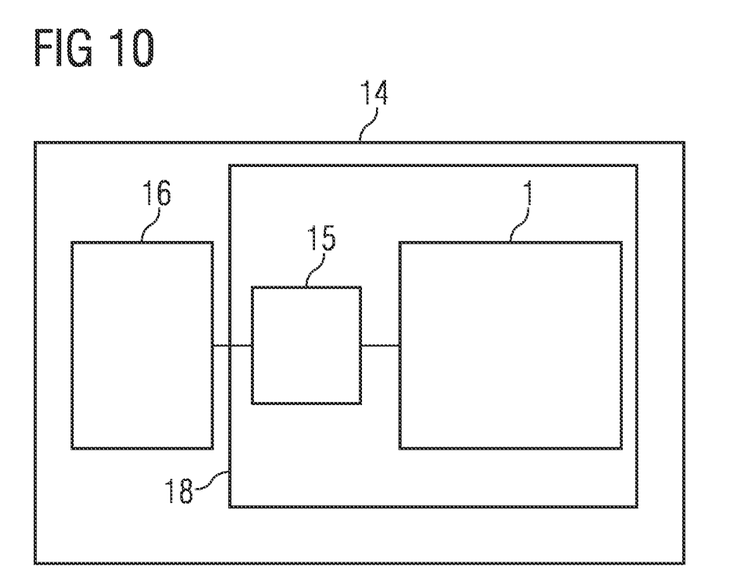
FIG. 10 shows a schematic diagram of an image sensor comprising a sensor arrangement.

FIG. 10 shows a schematic diagram of an exemplary embodiment of an image sensor 14 comprising the sensor arrangement 1 as discussed above. The image sensor 14 further comprises circuitry 15 for reading out electrical signals from the receiving elements. For example, the circuitry 15 may include storage capacitors, memory elements, an analog-to-digital converter (ADC) or the like. The circuitry 15 is electrically connected to the receiving elements 2, 3, 4, 5 of the sensor arrangement 1. It is noted that the sensor arrangement may comprise a plurality of receiving elements 2, 3, 4, 5. The circuitry 15 and the sensor arrangement 1 may be integrated on a sensor chip 18. The image sensor 14 further comprises an image signal processor, ISP 16, which is configured to generate a digital image based on the electrical signals from the receiving elements. Therefore, the ISP 16 is electrically connected to the circuitry 15 for reading out the electrical signals from the receiving elements. The ISP 16 may form a chip separate from the sensor chip 18. The circuitry 15 can be implemented such that the electrical signals coming from the receiving elements 2, 3, 4, 5 are pre-processed for the ISP 16. In that way, a standard ISP 16 can be used for debayering. The circuitry 15 may provide a further image processing path to the ISP 16 for image information in the IR wavelength domain.

The embodiments of the sensor arrangement 1 and the method of producing the sensor arrangement 1 disclosed herein have been discussed for the purpose of familiarizing the reader with novel aspects of the idea. Although preferred embodiments have been shown and described, many changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

The invention claimed is:

1. A sensor arrangement comprising:
    a first group of receiving elements being configured to detect light in the red wavelength range,
    a second group of receiving elements being configured to detect light in the green wavelength range,
    a third group of receiving elements being configured to detect light in the blue wavelength range,
    a fourth group of receiving elements being configured to detect light in the infrared wavelength range, such that
    a plurality of first sub-arrangements is formed by respective 2×2 arrays of receiving elements, each 2×2 array consisting of one receiving element of the first group, two receiving elements of the second group and one receiving element of the third group to form a first Bayer-like pattern,
    a plurality of second sub-arrangements is formed by respective 2×2 arrays of receiving elements, each 2×2 array consisting of two receiving elements of the second group, one receiving element of the fourth group and one receiving element of the first group to form a second Bayer-like pattern, and
    a plurality of third sub-arrangements is formed by respective 2×2 arrays of receiving elements, each 2×2 array consisting of two receiving elements of the second group, one receiving element of the third group and one receiving element of the fourth group to form a third Bayer-like pattern, wherein
    three of the first sub-arrangements, three of the second sub-arrangements and three of the third sub-arrangements are arranged in a 3×3 matrix, such that different sub-arrangements are adjacent to each other in the main plane of extension of the sensor arrangement.

2. The sensor arrangement according to claim 1, wherein receiving elements have a top surface of rectangular, in particular of square, shape.

3. The sensor arrangement according to claim 1, wherein receiving elements comprise a sensor element, in particular a photodiode.

4. The sensor arrangement according to claim 1, wherein receiving elements further comprise a wavelength filter.

5. An image sensor comprising:
    the sensor arrangement of claim 1, and
    circuitry for reading out electrical signals from the receiving elements.

6. The image sensor according to claim 5, further comprising an image signal processor, which is configured to generate a digital image based on the electrical signals from the receiving elements.

7. A method for producing a sensor arrangement, the method comprising:
    providing a first group of receiving elements which are configured to detect light in the red wavelength range,
    a second group of receiving elements which are configured to detect light in the green wavelength range,
    a third group of receiving elements which are configured to detect light in the blue wavelength range,
    a fourth group of receiving elements which are configured to detect light in the infrared wavelength range,
    forming a plurality of first sub-arrangements by respectively arranging 2×2 arrays of receiving elements, each 2×2 array consisting of one receiving element of the first group, two receiving elements of the second group and one receiving element of the third group in a first Bayer-like pattern,
    forming a plurality of second sub-arrangements by respectively arranging 2×2 arrays of receiving elements, each 2×2 array consisting of two receiving elements of the second group, one receiving element of the fourth group and one receiving element of the first group in a second Bayer-like pattern, and
    forming a plurality of third sub-arrangements by respectively arranging 2×2 arrays of receiving elements, each 2×2 array consisting of two receiving elements of the second group, one receiving element of the third group and one receiving element of the fourth group in a third Bayer-like pattern, wherein
    three of the first sub-arrangements, three of the second sub-arrangements and three of the third sub-arrangements are arranged in a 3×3 matrix, such that different sub-arrangements are adjacent to each other in the main plane of extension of the sensor arrangement.

* * * * *